United States Patent
Geywitz et al.

(10) Patent No.: US 9,017,218 B2
(45) Date of Patent: Apr. 28, 2015

(54) METHOD FOR CONTROLLING THE ENGINE OF A MOTOR VEHICLE HAVING A MANUAL TRANSMISSION

(75) Inventors: Georg Geywitz, Ittlingen (DE); Herbert Meyer, Regensburg (DE); Bernhard Vogt, Boblingen (DE); Michael Muhler, Munchingen (DE)

(73) Assignee: Audi AG, Ingolstadt (DE)

(*) Notice: Subject to any disclaimer, the term of this patent is extended or adjusted under 35 U.S.C. 154(b) by 2452 days.

(21) Appl. No.: 10/588,651

(22) PCT Filed: Feb. 1, 2005

(86) PCT No.: PCT/EP2005/000954
§ 371 (c)(1),
(2), (4) Date: Aug. 7, 2006

(87) PCT Pub. No.: WO2005/078261
PCT Pub. Date: Aug. 25, 2005

(65) Prior Publication Data
US 2007/0161457 A1 Jul. 12, 2007

(30) Foreign Application Priority Data
Feb. 12, 2004 (DE) .......... 10 2004 006 880

(51) Int. Cl.
 *B60W 10/04* (2006.01)
 *B60W 10/10* (2012.01)
 *F02D 11/10* (2006.01)
 *F02D 41/02* (2006.01)

(52) U.S. Cl.
 CPC .......... *F02D 11/105* (2013.01); *F02D 41/0225* (2013.01); *B60W 2510/0638* (2013.01); *B60W 2710/0666* (2013.01); *F02D 2250/18* (2013.01)

(58) Field of Classification Search
 CPC .......... F16D 48/06; F16D 48/08; F16H 63/50
 USPC .......... 477/107, 902; 123/333, 339, 16, 406, 123/23, 436
 See application file for complete search history.

(56) References Cited

U.S. PATENT DOCUMENTS

| | | | | |
|---|---|---|---|---|
| 4,843,553 A | * | 6/1989 | Ohata | 701/93 |
| 5,078,109 A | * | 1/1992 | Yoshida et al. | 123/350 |
| 6,000,376 A | * | 12/1999 | Hess et al. | 123/333 |
| 6,033,342 A | | 3/2000 | Steinel et al. | |

(Continued)

FOREIGN PATENT DOCUMENTS

| | | |
|---|---|---|
| DE | 42 09 091 C2 | 4/1996 |
| DE | 101 05 322 | 8/2002 |

(Continued)

OTHER PUBLICATIONS

Translation of IDS art FR2785238 Jul. 14, 2010.*

*Primary Examiner* — Tisha Lewis
(74) *Attorney, Agent, or Firm* — Novak Druce Connolly Bove + Quigg LLP

(57) ABSTRACT

In a motor vehicle having a manual transmission, for, in particular, limiting the engine speed during the start-up operation when fulfilling at least one permission criterion for the engine torque, the criterion depending on the driving state of the motor vehicle, a default engine torque is preset, which is specified according to at least one engine characteristic value and which can be reduced with regard to the set engine torque called for by the position of the accelerator pedal of the motor vehicle.

19 Claims, 2 Drawing Sheets

(56) References Cited

U.S. PATENT DOCUMENTS

| | | | |
|---|---|---|---|
| 6,041,276 | A | 3/2000 | John et al. |
| 6,258,008 | B1 | 7/2001 | Tabata et al. |
| 6,507,780 | B2 * | 1/2003 | Graf ............................... 701/51 |
| 6,742,498 | B2 * | 6/2004 | Mabuchi et al. .......... 123/339.16 |

FOREIGN PATENT DOCUMENTS

| | | |
|---|---|---|
| DE | 199 21 920 | 11/2005 |
| FR | 2 785 238 | 10/1999 |
| FR | 2 837 432 | 3/2002 |
| FR | 2 837 256 | 3/2003 |

* cited by examiner

METHOD FOR CONTROLLING THE ENGINE OF A MOTOR VEHICLE HAVING A MANUAL TRANSMISSION

This application is a U.S. National Stage of PCT/EP2005/000954, having been filed Feb. 1, 2005, which claims priority from DE 102004006880.1, having been filed on Feb. 12, 2004.

The invention relates to a method for controlling the engine of a motor vehicle having a manual transmission.

BACKGROUND OF THE INVENTION

In motor vehicles with manual transmissions there is a mechanical clutch which can normally be actuated by way of a foot pedal by the driver of a motor vehicle during a shifting process which takes place by manual actuation of the manual transmission to interrupt the flow of power between the engine and transmission of the vehicle. At high engine speed in idle and in a start-up process which takes place at high engine speed (for example, in a racing start with a slipping clutch) very high frictional work is transmitted to the clutch due to the large difference in speed between the engine and transmission. This leads to very strong thermal loading of the clutch; this results in premature clutch wear, especially for high-torque and high-pickup, high-revolution engines with four-wheel drive.

The object of the invention is to devise a method for engine control of a motor vehicle with a manual transmission, in which the adverse effects on the clutch, especially in the start-up process and in idling of the motor vehicle, are avoided.

SUMMARY OF THE INVENTION

In a motor vehicle with manual transmission in which there are no means for direct determination of the engaged gear, a reduction of the setpoint engine torque required by the driver by actuating the accelerator is allowed in particular for limiting the engine torque as long as at least one definable (applicable) approval criterion for the driving state of the motor vehicle is satisfied. In this connection at least one approval criterion dependent on the driving speed of the motor vehicle is used, especially a definable, applicable speed threshold not being reached by the driving speed of the motor vehicle; in this connection, preferably a value in the range from 30 km/h to 40 km/h, or a value below 40 km/h, for example a value of approximately 35 km/h, is defined as the speed threshold for the driving speed of the motor vehicle. Accordingly, at a driving speed of zero of the motor vehicle (when the vehicle is idling) or at a driving speed of the vehicle which is less than the speed threshold (in the process of the vehicle's starting up), instead of the setpoint engine torque required by the driver by actuating the accelerator, especially to limit the engine speed a default engine torque is determined which is reduced relative to the setpoint torque under certain assumptions. Optionally another approval criterion (especially in the process of the vehicle's starting up) is the applicable delay time, i.e., a possible reduction of the setpoint engine torque required by the drier by actuating the accelerator and thus the stipulation of a default engine torque which may deviate therefrom is approved only after a certain time interval has elapsed after recognition of the process of the vehicle's starting up. This delay time (for example 500 ms) can be used especially in motor vehicles with a slow build-up of engine power or engine torque as the approval criterion, for example in motor vehicles with turbochargers in which a slow build-up of the charging pressure takes place.

The default engine torque is determined in this process depending on at least one engine characteristic, preferably the engine speed on the one hand and the quotient of the engine speed and the driving speed of the vehicle on the other are used as engine characteristics. To generate the default engine torque, a torque factor to which values in the range from 0 to 1 are assigned is applied to the setpoint engine torque; the default engine torque thus deviates from the setpoint engine torque and is reduced relative to the setpoint engine torque if the torque factor does not reach 1; this is preferably the case when the engine speed of the vehicle exceeds a definable speed threshold (for example, a value of 4600 rpm is defined as the speed threshold) and when the quotient of the engine speed and the driving speed of the vehicle is within a definable value range (for example, between 100 $min^{-1}$/km/h and 500 $min^{-1}$/km/h). The torque factor can be determined from the characteristic map in which the engine characteristics used, preferably the engine speed and the quotient of the engine speed and the driving speed of the vehicle, are displayed. A default engine torque which has been reduced compared to the setpoint engine torque (for a torque factor which drops below 1) is ordinarily implemented by an action which influences the engine torque, especially by an action on the throttle valve and/or ignition and/or the fuel injection of the vehicle.

Preferably, with this process, without the requirement of explicit recognition of the engaged gear, a significant reduction of the stress on the clutch and thus avoidance of overloads on the clutch can be ensured by limiting the engine torque and accordingly the engine speed both when the vehicle is idling and also when the vehicle is starting up. In racy start-up maneuvers, especially in the case of starting up with high speed and load, adverse effects on agility, acceleration behavior or driving comfort of the vehicle are avoided based on the uniform influence on the default engine torque as a result of the engine characteristics engine speed and driving speed which are preferably used and as a result of avoiding sudden changes of torque limitation when the gears are recognized and changed. When the vehicle is idling the limitation of engine torque and accordingly the engine speed can be used for acoustic purposes.

In

DETAILED DESCRIPTION OF THE PREFERRED EMBODIMENT OF THE INVENTION

Figure 1:
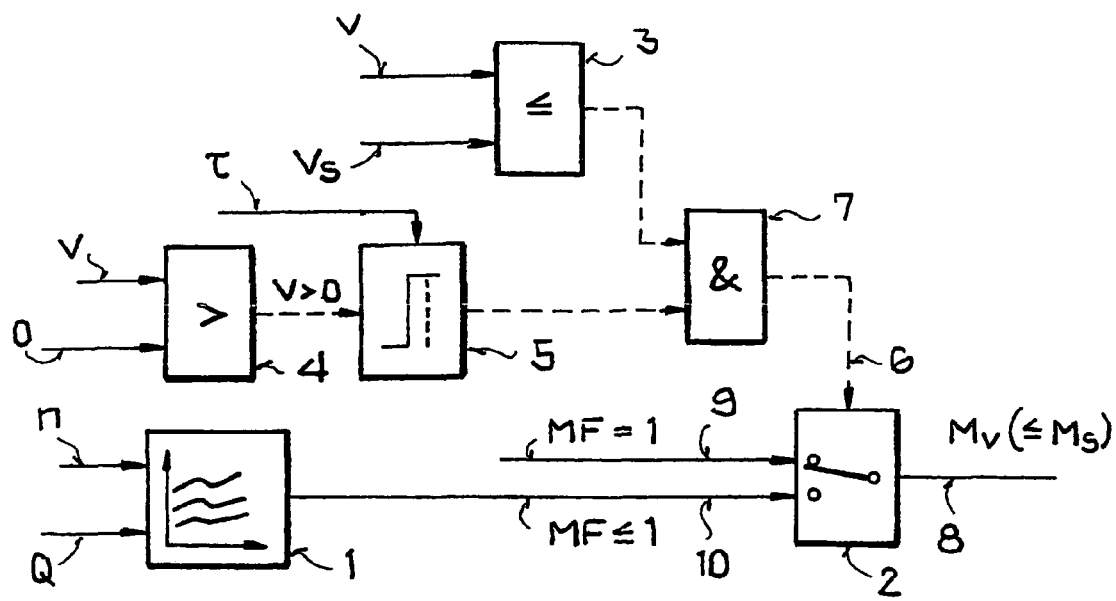
FIG. 1 shows a block diagram of the torque control.

FIG. 1 shows a block diagram of an engine control which influences the start-up process of a vehicle with a manual transmission.

Influencing the setpoint engine torque $M_s$ required by the driver of the vehicle by actuating the accelerator (see FIG. 2) and thus the stipulation of a default engine torque ($M_v$) ($M_v \leq M_s$) which may have been reduced in comparison here is allowed only when at least one approval criterion is met. The approval criterion to be met is for example the start-up or initial rolling of the vehicle (driving speed v of the vehicle >0; this is checked by means of a comparator 4), the progression of the delay time τ (the delay time τ of for example 500 ms is set by the delay element 5) and failure to reach a speed threshold $v_s$ (driving speed v of the vehicle <speed threshold $v_s$ of for example 35 km/h; this is checked by means of the comparator 3). When all approval criteria are met, at the output of the logic element 7 a corresponding logic signal is delivered to the control line 9 and actuates the switching element 2 which switches from the input line 9 (stipulation of a default torque $M_v$ at the output 8 of the switching element 2 is blocked) to the input line 10 (stipulation of a default torque $M_v$ at the output 8 of the switching element 2 is cleared). By multiplication of the setpoint engine torque $M_s$ by the torque factor MF (MF≤1) a default torque $M_v$ is generated which is at most as large as the setpoint engine torque M, under certain circumstances, but smaller than the setpoint engine torque $M_s$ (no reduction of the setpoint engine torque $M_s$ at MF=1; reduction of the setpoint engine torque $M_s$ at MF<1). To determine the torque factor MF with the input line 10 of the switching element 2 isolated, the two engine characteristics speed n on the one hand and the quotient Q of engine speed n and the driving speed v of the vehicle on the other are used and are sent as input values to the characteristic map 1, at the output of which the torque factor MF (MF≤1) is output to the input line 10. For example, the torque factor MF is only then different from 1 (MF<1) and in this way by way of the output 8 of the switching element 2 causes an action on the setpoint engine torque $M_s$ to limit the engine speed, when the engine speed n exceeds the speed threshold $n_s$ (for example a value of 4600 $min^{-1}$ is stipulated as the speed threshold) and the quotient Q of the engine speed n and the driving speed v of the vehicle is within a certain value range (for example, this range of values from 150 $min^{-1}$/km/h to 500 $min^{-1}$/km/h is stipulated; this corresponds approximately to the range of first gear of a conventional manual transmission). The action to reduce the setpoint engine torque $M_s$ to the default torque $M_v$ for a torque factor MF less than 1 (MF<1) can take place for example by way of the throttle valve or the injection instant or the ignition instant.

Figure 2:
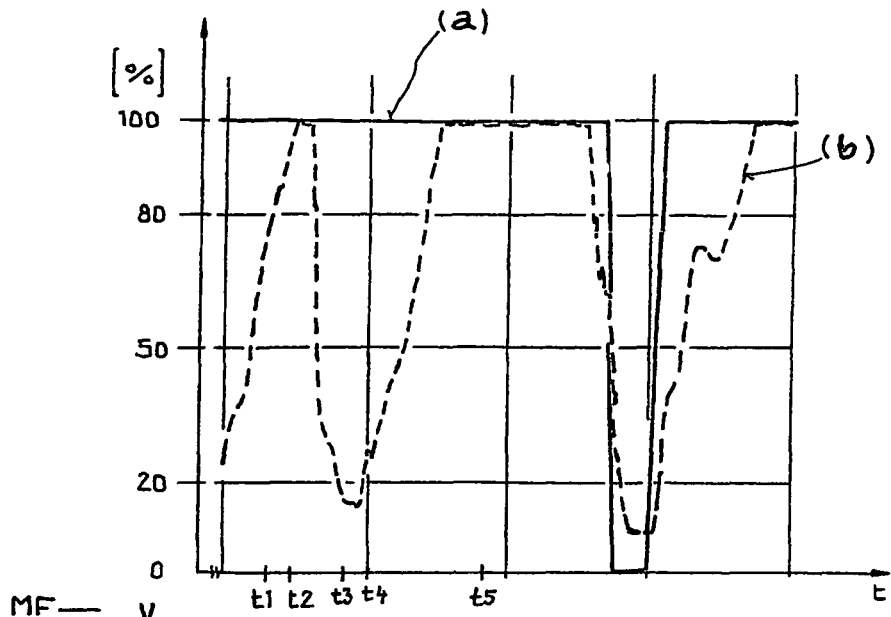
FIG. 2 shows the variation of the position of the accelerator and throttle valve as a function of time in the start-up process.
Figure 3:
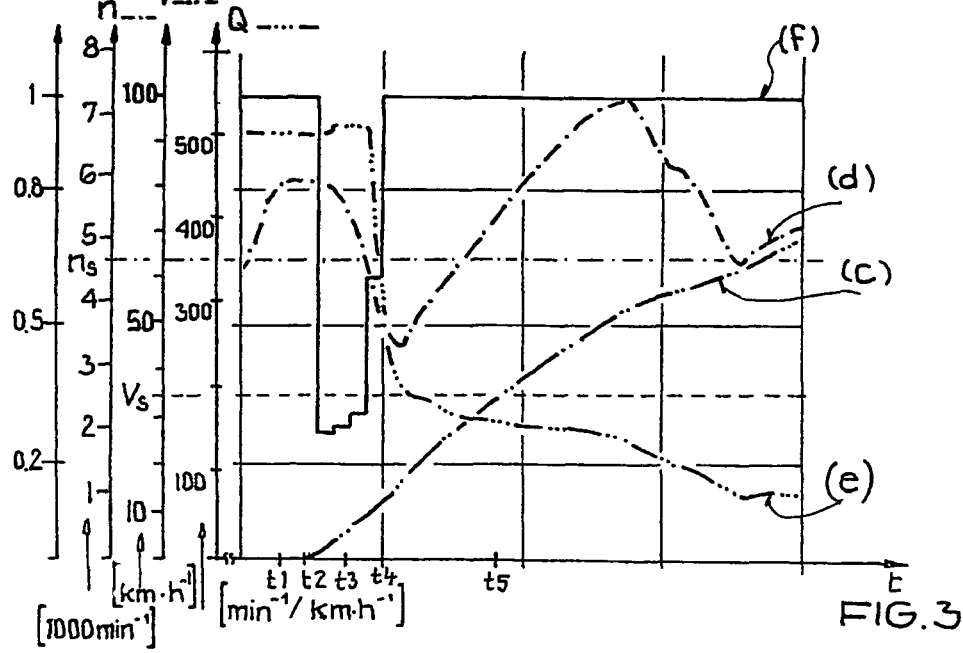
FIG. 3 shows the variation of various engine characteristics in the start-up process as a function of time.

FIGS. 2 and 3 shows the variation of certain engine characteristics of a motor vehicle with a manual transmission in a racing start (start-up of the vehicle at full throttle and with clutch depressed) as a function of time. FIG. 2 shows the variation of the position of the accelerator dictated by the driver as a function of time (curve (a) as a measure for the setpoint engine torque $M_s$) and the position of the throttle valve (curve (b) as a measure of the default torque $M_v$), in FIG. 3 the variation of the driving speed v (curve (c) as a function of time), the engine speed n (curve (d)), of the quotient Q of the engine speed n and the driving speed v (curve (e)), and of the torque factor (curve (f)).

At time $t_1$ before the vehicle starts off, for a racing start the accelerator is completely depressed (curve (a)) and accordingly the throttle valve is completely opened (curve (b)), at the same time the clutch pedal is depressed. The engine speed n (curve (d)) rises to a critical value of for example 5800 $min^{-1}$ which is above the speed threshold $n_s$ of for example 4600 $min^{-1}$.

At time $t_2$ when the vehicle starts up (starting to roll) the clutch is suddenly or gradually released, the accelerator (curve (a)) remains completely depressed and the throttle valve (curve (b)) is completely (100%) opened (full throttle), by which the driving speed v (curve (c)) assumes a non-zero value (v>0). The engine speed n (curve (d)) remains at a value above the speed threshold $n_s$ (for example, 4600 $min^{-1}$). As a result of the high rpm difference between the engine and transmission of the vehicle, this can lead to thermal overloading of the clutch and thus to wear (failure) of the clutch.

At time $t_3$, immediately after the vehicle starts up however limitation of the engine torque M from the setpoint engine torque $M_s$ to the default torque $M_v$ is effected however by way of the torque factor MF, since on the one hand the approval criteria for the default torque $M_v$ are satisfied (driving speed v>0 and driving speed v is less than the speed threshold $v_s$ of for example 35 km/h), a delay time τ after time $t_2$ (start-up of the vehicle) is for example not stipulated (τ=0), and on the other hand, based on the values of the engine characteristics, engine speed n and quotient Q of the engine speed n and the driving speed v, as the input quantities of the characteristic map 1 (in particular, the engine speed n exceeds the torque threshold $n_s$ of 4600 $min^{-1}$, while the quotient Q is in a stipulated value range which is characteristic of first gear), a torque factor different from 1 is output by the characteristic map 1 (MF≤1, for example the minimum value of MF is approximately 0.3). In this way the completely opened throttle valve (throttle valve opening 100%) is again partially closed (opening of the throttle valve <100%, for example approximately 20% opening of the throttle valve) and therefore a default torque $M_v$ reduced compared to the setpoint engine torque $M_s$ is delivered as the engine torque; this also causes a reduction of the engine speed n which accordingly drops below the speed threshold ns of 4600 $min^1$.

At time $t_4$, based on the now altered values of the engine characteristics engine speed n and quotient Q of the engine speed n and driving speed v as the input quantities of the characteristic map 1 (especially by reducing the engine speed n, which thus again falls below the speed threshold $n_s$ of 4600 $min^{-1}$) again the value 1 for the torque factor MF is output by the characteristic map 1 (MF=1), by which the throttle valve (curve (b)) is opened again according to the position of the accelerator (curve (a)) (opening of the throttle valve to 100%) and the default torque $M_v$, which corresponds to the setpoint engine torque $M_s$ is delivered as the engine torque.

At time $t_6$, when the speed threshold $v_s$ of for example 35 km/h is reached for the driving speed v, the approval criterion for the stipulation of the default torque $M_v$ is no longer satisfied, so that starting from this instant $t_5$ the stipulation of the default torque $M_s$ is deactivated. In this way the switching element 2 as shown in FIG. 1 is switched to the input line 9 and the setpoint engine torque $M_5$ required by the position of the accelerator is output on the output line 8 of the switching element 2.

The invention claimed is:

1. Method for controlling an engine of a motor vehicle having a manual transmission, the method comprising, when at least one approval criterion is satisfied for an engine torque which is dependent on the driving state of the vehicle, stipulating a default engine torque which can be reduced relative to a setpoint engine torque required by the position of an accelerator of the vehicle, and wherein the default engine torque is determined as a function of at least one current engine characteristic, wherein the approval criterion is a driving speed of the vehicle, and wherein the default engine torque is stipulated depending on at least one current engine characteristic when a speed threshold for the driving speed of the vehicle is not reached.

2. The method as claimed in claim 1, wherein the default engine torque is stipulated only after recognition of a start-up process of the vehicle depending on at least one current engine characteristic.

3. The method as claimed in claim 1, wherein an additional approval criterion is a delay time after recognizing the process of the vehicle's starting up, and wherein the default engine torque after the delay time elapses is stipulated depending on at least one current engine characteristic.

4. Method for controlling the engine of a motor vehicle having a manual transmission, the method comprising, when at least one approval criterion is satisfied for an engine torque which is dependent on the driving state of the vehicle, stipulating a default engine torque which can be reduced relative to a setpoint engine torque required by the position of an accelerator of the vehicle, and wherein at least engine speed and a quotient of the engine speed and driving speed of the vehicle are used as engine characteristics for determining the default engine torque.

5. The method as claimed in claim 4, wherein the default engine torque which causes speed limitation of the engine speed, is reduced relative to the setpoint engine torque when the engine speed exceeds a speed threshold and the quotient of the engine speed and driving speed of the vehicle is within a specific value range.

6. The method as claimed in claim 5, wherein a value of 4600 rpm is stipulated as the speed threshold for the engine speed.

7. The method as claimed in claim 1, wherein the default engine torque is determined by applying a torque factor to the setpoint engine torque.

8. The method as claimed in claim 7, wherein the torque factor is determined from a characteristic map.

9. The method as claimed in claim 1, wherein when the default engine torque deviates from the setpoint engine torque an action on at least one of a throttle valve, an ignition and a fuel injection of the vehicle is initiated.

10. The method as claimed in claim 1, wherein a value in the range from 25 km/h to 40 km/h is stipulated as the speed threshold for the driving speed of the vehicle.

11. The method as claimed in claim 10, wherein a value of 35 km/h is stipulated as the speed threshold for the driving speed of the vehicle.

12. The method as claimed in claim 1, wherein the default engine torque in idling of the vehicle is stipulated for acoustically influencing engine noise.

13. The method as claimed in claim 1, wherein the default engine torque in the process of the vehicle's starting up is stipulated for avoiding damage to a clutch of the vehicle.

14. A method comprising
measuring an engine speed and a driving speed of a motor vehicle having a manual transmission;
determining a torque factor based on the engine speed and the driving speed; and
determining a default torque by multiplying a setpoint torque by the torque factor, when the engine speed exceeds a predetermined threshold and when a quotient of the engine speed and the driving speed is within a predetermined range.

15. The method according to claim 14, wherein the torque factor is less than or equal to 1.

16. The method according to claim 14, wherein the method does not comprise recognizing whether a gear is engaged in the motor vehicle.

17. The method according to claim 14, wherein the predetermined threshold is greater than or equal to 4600 rpm.

18. The method according to claim 14, wherein the predetermined range is from 100 $min^{-1}$/km/h to 600 $min^{-1}$/km/h.

19. The method according to claim 14, further comprising limiting the setpoint torque to the default torque after a time interval has elapsed after the vehicle is started.

\* \* \* \* \*